United States Patent
Ono

(10) Patent No.: US 10,066,543 B2
(45) Date of Patent: Sep. 4, 2018

(54) CONTROL DEVICE FOR INTERNAL COMBUSTION ENGINE

(71) Applicant: Mitsubishi Electric Corporation, Tokyo (JP)

(72) Inventor: Takahiko Ono, Hyogo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 546 days.

(21) Appl. No.: 14/588,501

(22) Filed: Jan. 2, 2015

(65) Prior Publication Data

US 2016/0108803 A1 Apr. 21, 2016

(30) Foreign Application Priority Data

Oct. 16, 2014 (JP) ................................ 2014-211366

(51) Int. Cl.
*F02D 23/00* (2006.01)
*F02B 39/16* (2006.01)
(Continued)

(52) U.S. Cl.
CPC .............. *F02B 39/16* (2013.01); *F02B 37/18* (2013.01); *F02D 41/0007* (2013.01);
(Continued)

(58) Field of Classification Search
CPC ...... F02B 39/16; F02B 37/18; F02D 41/0007; F02D 41/221; F02D 41/123
(Continued)

(56) References Cited

U.S. PATENT DOCUMENTS 6,453,261 B2 9/2002 Boger et al.
6,687,601 B2 * 2/2004 Bale ....................... F02M 26/48
123/568.16
(Continued)

FOREIGN PATENT DOCUMENTS

JP 2008-069660 A 3/2008
JP 2008-095587 A 4/2008
(Continued)

OTHER PUBLICATIONS

Communication dated Nov. 4, 2015, issued by the Japan Patent Office in Japanese Application No. 2014-211366.
(Continued)

*Primary Examiner* — Ngoc T Nguyen
(74) *Attorney, Agent, or Firm* — Sughrue Mion, PLLC; Richard C. Turner

(57) ABSTRACT

Supply a control device for an internal combustion engine in which an abnormality of an exhaust-bypass valve, such as a WGV, can be certainly detected under wide operation conditions. In the control device, a required-operation position of the exhaust-bypass valve, which is set in accordance with an operating condition of the internal combustion engine, is set to a target position, and an exhaust-bypass-valve-driving device is controlled in such a way that a real position, which is detected by a position sensor, agrees with the target position, and when a real position, which is detected by a position sensor, reaches a predetermined abnormality-judgment value, it is judged that an abnormality is caused in a mechanical-connecting condition from the exhaust-bypass valve to the exhaust-bypass-valve-driving device.

10 Claims, 7 Drawing Sheets

(51) Int. Cl.
  *F02B 37/18* (2006.01)
  *F02D 41/22* (2006.01)
  *F02D 41/00* (2006.01)
  *F02D 41/12* (2006.01)

(52) U.S. Cl.
  CPC .......... *F02D 41/221* (2013.01); *F02D 41/123* (2013.01); *Y02T 10/144* (2013.01); *Y02T 10/40* (2013.01)

(58) Field of Classification Search
  USPC ..................................... 60/602, 605.1, 605.2
  See application file for complete search history.

(56) References Cited

U.S. PATENT DOCUMENTS

| | | | |
|---|---|---|---|
| 2002/0144674 A1 | 10/2002 | Wang et al. | |
| 2010/0043429 A1* | 2/2010 | Wolk | F02B 37/18 60/602 |
| 2010/0170244 A1* | 7/2010 | Brooks | F02D 21/08 60/602 |
| 2011/0154892 A1* | 6/2011 | Ibuki | F02B 37/013 73/114.79 |
| 2012/0053812 A1* | 3/2012 | Bauerle | F02D 9/02 701/101 |
| 2012/0191321 A1* | 7/2012 | Ibuki | F02B 37/004 701/102 |
| 2012/0209496 A1 | 8/2012 | Miyashita | |
| 2012/0210710 A1* | 8/2012 | Chevalier | F02B 39/16 60/602 |

FOREIGN PATENT DOCUMENTS

| | | | | |
|---|---|---|---|---|
| JP | 5196036 B2 | | 5/2013 | |
| KR | 20110076735 A | * | 7/2011 | ............ F02B 37/186 |

OTHER PUBLICATIONS

Communication dated Jan. 14, 2016 from the German Patent and Trademark Office issued in corresponding Application No. 10 2015 200 904.1.

Communication dated Jan. 3, 2018, from State Intellectual Property Office of the P.R.C. in counterpart application No. 201510119594.2.

* cited by examiner

CONTROL DEVICE FOR INTERNAL COMBUSTION ENGINE

BACKGROUND OF THE INVENTION

Technical Field

The present invention relates to a control device for an internal combustion engine having a turbocharger, and particularly relates to a control device for an internal combustion engine in which an abnormality of an exhaust-bypass valve, such as a waste-gate valve, is detected.

Background Art

In a conventional internal combustion engine having a turbocharger, a control device for the internal combustion engine is known, in which an abnormality of a waste-gate valve (hereinafter, referred to as a WGV) is detected. For example, in Japanese Laid-Open Patent Publication No. 2008-95587, a control device for an internal combustion engine is disclosed, in which an index value for indicating an increment of a supercharging pressure at an initial condition for supercharging the engine is obtained, and when the index value is lower than a predetermined reference value, it is judged that a closing-operation failures of the WGV is caused.

Moreover, in Japanese Patent Publication No. 5196036, a control device for an internal combustion engine is disclosed, in which it is judged that an operation abnormality of a WGV is caused or not caused in accordance with a pressure variation in an intake air pipe when an exhaust gas recirculation valve (ECR valve) is opened and the WGV is opened.

CONVENTIONAL ART DOCUMENT

Patent Document

Patent Document 1:
Japanese Laid-Open Patent Publication No. 2008-95587
Patent Document 2:
Japanese Patent Publication No. 5196036

SUMMARY OF THE INVENTION

Problems to be Solved by the Invention

It is estimated that operation abnormalities of a WGV is caused by a fault of an electrical system, an adhesion of a WGV, a breakage of the WGV, a rupture of a joint component, or a fault of a waste-gate actuator (hereinafter, referred to as a WGA). However, in an abnormality-detection method of the WGA in a device disclosed in Japanese Laid-Open Patent Publication No. 2008-95587, there have been problems in that a method of identifying the cause of the operation abnormalities is not described, and even if an abnormality of the WGA is detected, many times for troubleshooting are required in order to identify the cause and the fault part. Moreover, in a conventional device disclosed in Japanese Laid-Open Patent Publication No. 2008-95587, there have been problems in that a fault diagnosis cannot be performed if an internal combustion engine is not operated under a high-rpm and heavy-load operating condition in which the supercharging pressure is increased, so that the abnormality of the WGV cannot be detected, for example, when the internal combustion engine is operated under a low-rpm and light-load operating condition.

On the other hand, in a conventional device disclosed in Japanese Patent Publication No. 5196036, a fault diagnosis can be performed when a rotational speed is reduced and feed of fuel is cut in an internal combustion engine, so that the abnormality can be more detected if the technology disclosed in Japanese Laid-Open Patent Publication No. 2008-95587 and the conventional device disclosed in Japanese Patent Publication No. 5196036. However, there has been a problem in that the fault diagnosis cannot be performed when the internal combustion engine is stopped or idled.

The present invention has been made to solve above-described problems, and an object of the invention is to provide a control device for an internal combustion engine in which an abnormality of an exhaust-bypass valve, such as a WGV, can be certainly detected under wide operation conditions.

Means for Solving Problems

A control device for an internal combustion engine of the present invention includes a turbocharger including a turbine which is provided at an exhaust passage of the internal combustion engine, and a compressor which is provided at an intake air passage of the internal combustion engine so as to be integrally rotated with the turbine; an exhaust-bypass valve which is provided at an exhaust-bypass passage for linking an upstream side and an downstream side of the turbine so as to control a flow rate of exhaust gas, which flows through the exhaust-bypass passage, of the internal combustion engine; an exhaust-bypass-valve-driving device which is mechanically connected to the exhaust-bypass valve so as to regulate an operation position of the exhaust-bypass valve; a position sensor for detecting the operation position of the exhaust-bypass valve; a required-exhaust-bypass-valve-operation-position-setting component for setting a required-exhaust-bypass-valve-operation position of the exhaust-bypass valve in accordance with an operating condition of the internal combustion engine; a target-position-setting component for setting the required-exhaust-bypass-valve-operation position, which is set by the required-exhaust-bypass-valve-operation-position-setting component, to a target position; an exhaust-bypass-valve-control component for controlling the exhaust-bypass-valve-driving device in such a way that the current position, which is detected by the position sensor, agrees with the target position which is set by the target-position-setting component; and an abnormality-judgment component for judging that an abnormality is caused in a mechanical-connecting condition from the exhaust-bypass valve to the exhaust-bypass-valve-driving device when the current position, which is detected by the position sensor, reaches a predetermined abnormality-judgment value. Throughout the specification, the current position may be referred to as the "real position" i.e., the true position of the exhaust-bypass valve such as open, close, half open, and so on.

Effects of the Invention

According to the control device for an internal combustion engine of the present invention, the control device includes a required-exhaust-bypass-valve-operation-position-setting component for setting a required-exhaust-bypass-valve-operation position of the exhaust-bypass valve in accordance with an operating condition of the internal combustion engine; a target-position-setting component for setting the required-exhaust-bypass-valve-operation position, which is set by the required-exhaust-bypass-valve-operation-position-setting component, to a target position;

an exhaust-bypass-valve-control component for controlling the exhaust-bypass-valve-driving device in such a way that the real position, which is detected by the position sensor, agrees with the target position which is set by the target-position-setting component; and an abnormality-judgment component for judging that an abnormality is caused in a mechanical-connecting condition from the exhaust-bypass valve to the exhaust-bypass-valve-driving device when the real position, which is detected by the position sensor, reaches a predetermined abnormality-judgment value. Therefore, it can be identified that the exhaust-bypass valve or the joint component is broken, and a time for trouble-shooting the abnormality can be decreased. Moreover, the closing-operation failures of the exhaust-bypass valve can be detected in accordance with the real position detected by the position sensor, and at least the abnormality in the mechanical-connecting condition from the exhaust-bypass valve to the exhaust-bypass-valve-driving device can be detected in the closing-operation failures of the exhaust-bypass valve without limitation of a high-rpm and heavy-load operating condition in which the supercharging pressure is increased, and regardless of the operating condition of the internal combustion engine.

DETAILED DESCRIPTION OF THE PREFERRED EMBODIMENTS

Embodiment 1

Figure 1:
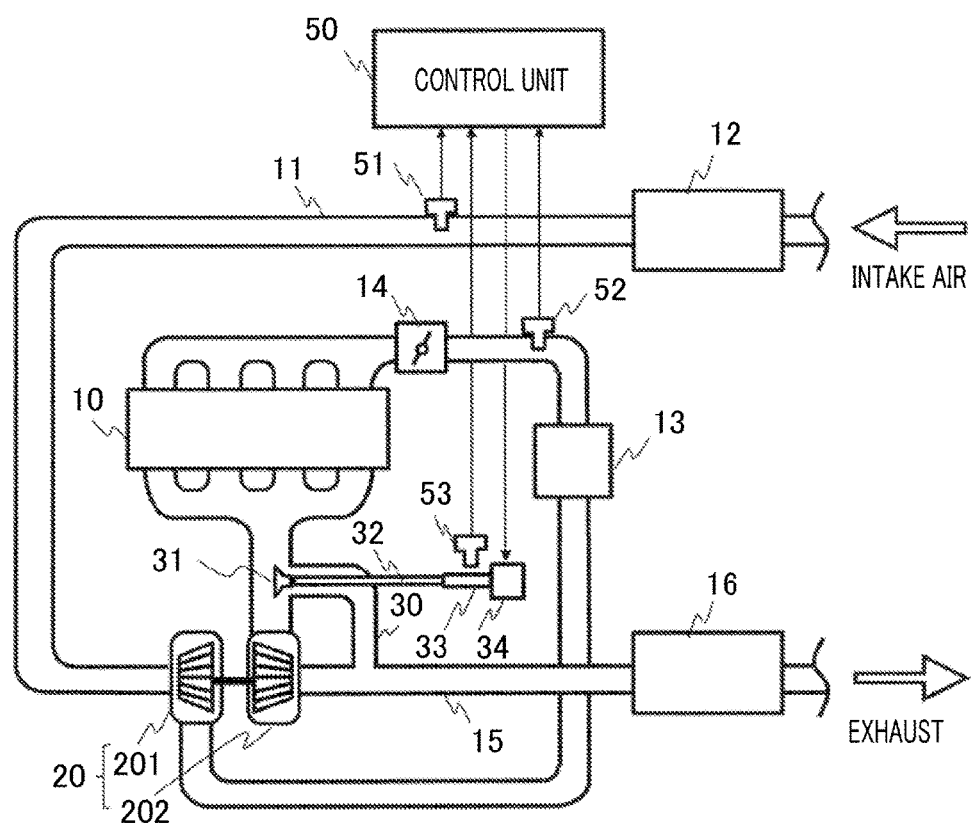
FIG. 1 is a system configuration diagram illustrating an internal combustion engine to which a control device for the internal combustion engine according to Embodiment 1 and Embodiment 2 of the present invention is applied.

FIG. 1 is a system configuration diagram illustrating an internal combustion engine to which a control device for the internal combustion engine according to Embodiment 1 of the present invention is applied. In FIG. 1, an air cleaner 12 is attached at an inlet of an intake air passage 11 of an internal combustion engine 10. An airflow sensor 51 for detecting an amount of intake air is provided at a downstream side of the air cleaner 12.

A turbocharger 20 is provided at a downstream side of the airflow sensor 51. The turbocharger 20 includes a compressor 201 and a turbine 202. The compressor 201 and the turbine 202 are integrally linked by a link shaft. The compressor 201 is driven and rotated in accordance with energy of exhaust gas which is inputted to the turbine 202. Moreover, an intercooler 13 for cooling the compressed air is arranged at a downstream side of the compressor 201, and a throttle valve 14 is arranged at a further downstream side of the intercooler 13. In addition, a throttle-upstream-pressure sensor 52 for detecting a pressure of the intake air, which is supercharged by the turbocharger 20, is provided between the intercooler 13 and the throttle valve 14.

An exhaust system of the internal combustion engine 10 includes an exhaust passage 15. The turbine 202 of the turbocharger 20 is provided at a halfway position of the exhaust passage 15. Moreover, an exhaust-bypass passage 30, which bypasses the turbine 202 and links an inlet side and an outlet side of the turbine 202, is added to the exhaust passage 15. A waste-gate valve (WGV) 31 used as an exhaust-bypass valve is arranged at the exhaust-bypass passage 30. Moreover, an exhaust-cleaning catalyst 16 for cleaning the exhaust gas is arranged at a downstream side of the turbine 202.

The WGV 31, which is arranged at the exhaust-bypass passage 30, is mechanically connected to one end portion of a joint component 32. The other end portion of the joint component 32 is mechanically connected to a waste-gate actuator (WGA) 34 which is used as an exhaust-bypass-valve-driving device. Moreover, a position sensor 53 for detecting position information, which is related to an opened-valve position of the WGV 31, is provided near a WGA output shaft 33 used as an output shaft of the WGA 34. In addition, although the position sensor 53 is not integrally configured with the WGA 34 in Embodiment 1, the position sensor 53 may be installed in the WGA 34.

The control device for the internal combustion engine 10 according to Embodiment 1 of the present invention includes a control unit 50. Various sensors, such as the airflow sensor 51, the throttle-upstream-pressure sensor 52, the position sensor 53, a crank angle sensor (not illustrated), and a throttle aperture sensor (not illustrated), are connected to an input component of the control unit 50 in order to detect operating conditions of the internal combustion engine 10. Various actuators, such as the WGA 34, an injector (not illustrated), and an ignition coil (not illustrated), are connected to an output component of the control unit 50 in order to control the operating conditions of the internal combustion engine 10. The control unit 50 optimally controls a combustion condition and output torque of the internal combustion engine 10 by operating the various actuators in accordance with the various inputted information items.

Figure 2:
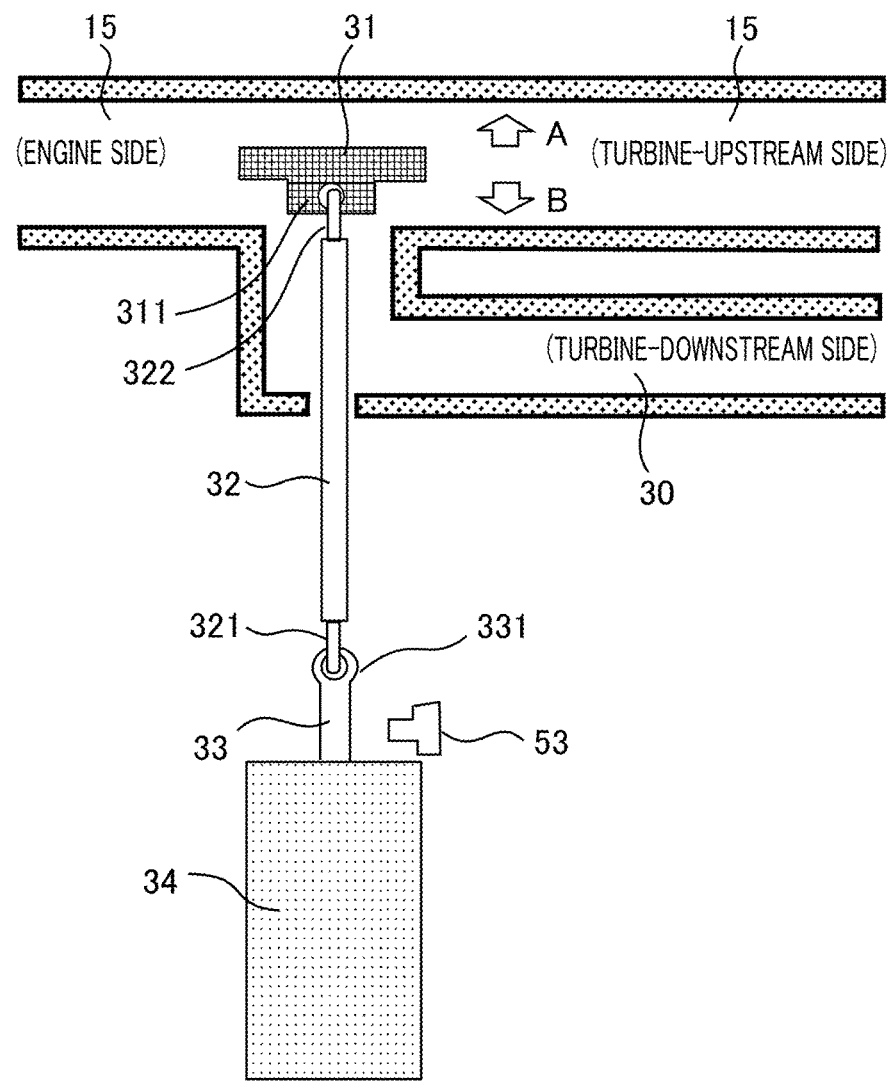
FIG. 2 is an explanatory diagram illustrating a mechanical-connecting condition of a WGV and a WGA in the internal combustion engine to which the control device for the internal combustion engine according to Embodiment 1 and Embodiment 2 of the present invention is applied.

Hereinafter, a mechanical-connecting condition of the WGV 31 and the WGA 34 will be explained in detail. FIG. 2 is an explanatory diagram illustrating a mechanical-connecting condition of the WGV 31 and the WGA 34 in the internal combustion engine to which the control device for the internal combustion engine according to Embodiment 1 of the present invention is applied. In FIG. 2, the WGV 31 and the WGA 34 are not directly connected, but those are connected via the joint component 32. In a more detail explanation, a WGA output-shaft-linkage portion 331 having an annular shape, which is formed at a tip of the WGA output shaft 33, and a first joint-component-linkage portion 321 having an annular shape, which is formed at one end portion of the joint component 32, penetrate each inside of the portions, whereby those are freely shaken and linked. A second joint-component-linkage portion 322 penetrates a through-hole of a WGV linkage portion 311, whereby the WGV linkage portion 311 having the through-hole, which is formed at the WGV 31, and the second joint-component-linkage portion 322 having an annular shape, which is formed at the other end portion of the joint component 32, are freely shaken and linked.

The WGV 31 is arranged in the exhaust passage 15, so that the WGV 31 is exposed to exhaust gas ejected from the internal combustion engine 10 so to be reached to a high-temperature condition at several hundred of degrees. Therefore, when a heat resistance of the WGA 34, in which electric components, such as a motor and the like, are installed, is considered, the WGA 34 cannot be arranged near the WGV 31, so that the joint component 32 intervenes between the WGV 31 and the WGA 34 in order to prevent the WGA 34 from reaching to a high-temperature condition. Moreover, it is one reason of the intervention of the joint component 32 that a mounting position of the WGA 34 in a car is more freely determined, and the WGA 34 is more easily arranged when the WGA 34 and the WGV 31 are mechanically connected via the joint component 32.

As described above, the motor, which can be normally or reversely rotated, is installed in the WGA 34, and the WGA 34 includes the WGA output shaft 33 which converts a rotational movement of the motor to a linear movement of the shaft. The WGA output shaft 33 can be shifted in a shaft direction in accordance with current directions of the motor. When the motor is energized in such a way that the WGA output shaft 33 is pushed toward the WGV 31 side in the shaft direction, the WGV 31 can be shifted, via the joint component 32, in an opened-valve direction (direction indicated by the arrow "A" in FIG. 2). In a reverse way, when the motor is energized in such a way that the WGA output shaft 33 is pulled toward the WGA 34 in the shaft direction, the WGV 31 can be shifted, via the joint component 32, in a closed-valve direction (direction indicated by the arrow "B" in FIG. 2).

Moreover, the position sensor 53 is provided near the WGA output shaft 33 side, and the control device is configured in such a way that a position in the shaft direction of the WGA output shaft 33, which is detected by the position sensor 53, is inputted to the control unit 50 so as to be used as an operation position—an opened-valve position, a closed-valve position, or a half-opened-valve position—of the WGV 31.

Figure 3:
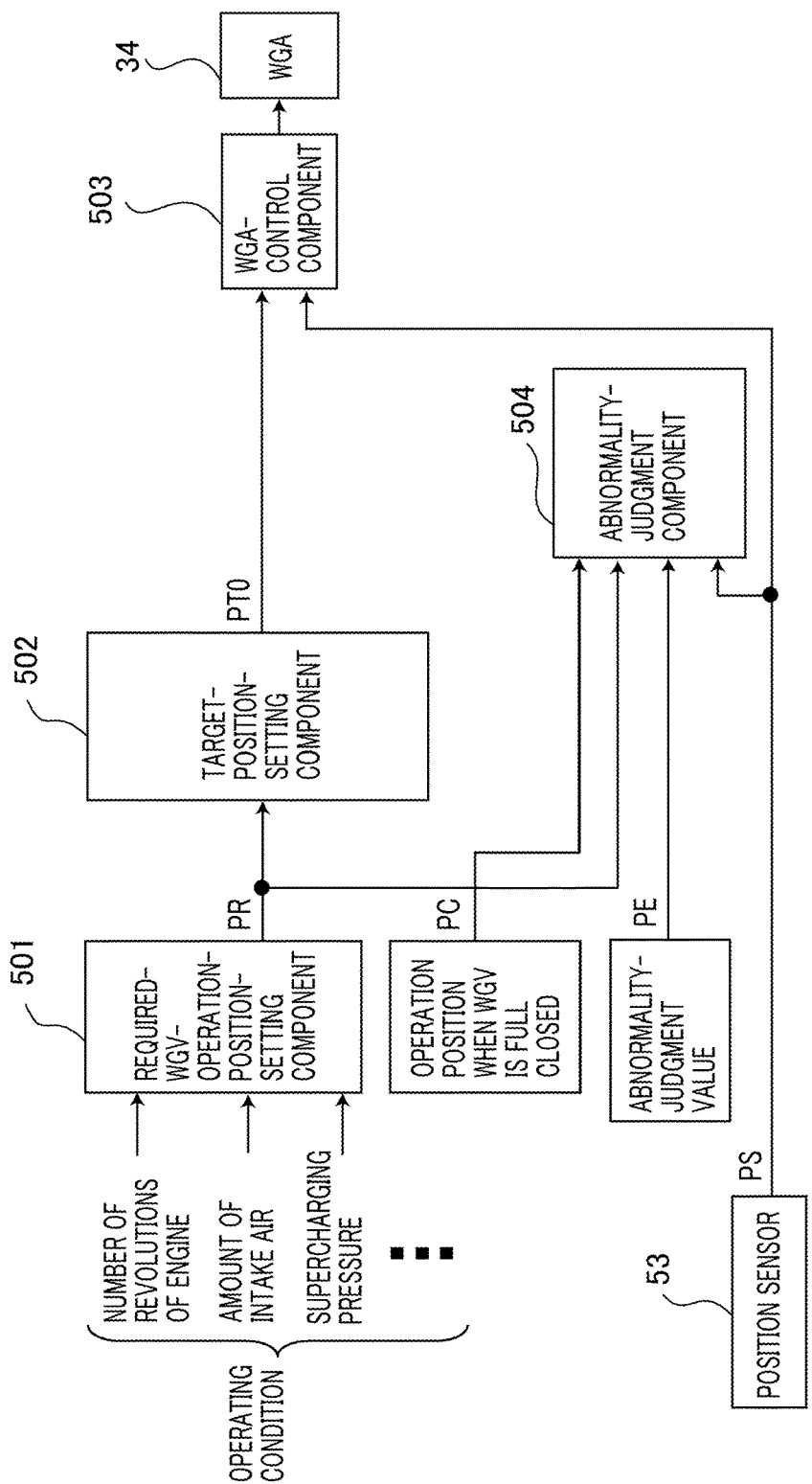
FIG. 3 is a block diagram illustrating the control device for the internal combustion engine according to Embodiment 1 of the present invention.

FIG. 3 is a block diagram illustrating the control device for the internal combustion engine according to Embodiment 1 of the present invention. Hereinafter, a configuration and an operation related to a basic control of the WGV 31 will be explained in reference to FIG. 3. Firstly, the basic control of the WGV 31 will be explained. A required-WGV-operation-position-setting component 501, which is used as a required-exhaust-bypass-valve-operation-position-setting component, inputs a plurality of information items, such as a number of revolutions of the internal combustion engine 10, an amount of intake air detected by the airflow sensor 51, and a supercharging pressure detected by the throttle-upstream-pressure sensor 52, which indicate an operating condition of the internal combustion engine 10, and then, a required-WGV-operation position PR, which is used a required-exhaust-bypass-valve-operation position of the WGV 31, is set in accordance with the information items.

The required-WGV-operation position PR of the WGV 31, which is set by the required-WGV-operation-position-setting component 501, is set to a target position PT0 in a target-position-setting component 502. In Embodiment 1, the control device is controlled in accordance with the following formula.

$$PT0 = PR$$

The real position PS, which is detected by the position sensor 53, and the target position PT0, which is set by the target-position-setting component 502, are inputted to a WGA-control component 503 used as an exhaust-bypass-valve-control unit, and the WGA 34 is controlled in such a way that the real position PS agrees with the target position PT0.

Secondly, a configuration and an operation related to abnormality-judgment control of the WGV 31 will be explained. An abnormality-judgment component 504 inputs the real position PS, which is detected by the position sensor 53, and an abnormality-judgment value PE, which is set in order to judge that an operation position of the WGV 31 is deviated from the full-closed valve condition. When the real position PS reaches the abnormality-judgment value PE, it is judged that an abnormality is caused in a mechanical-connecting condition from the WGV 31 to the WGA 34.

Moreover, the abnormality-judgment component 504 inputs the required-exhaust-bypass-valve-operation position PR, which is set by the required-WGV-operation-position-setting component 501, and an operation position PC at which the WGV 31 is full closed. Moreover, the required-exhaust-bypass-valve-operation position PR is compared with the operation position PC at which the WGV 31 is full closed. Only when the comparison result indicates the following formula, in other words, only when the operation position PC, at which the WGV 31 is full closed, is set to the required-exhaust-bypass-valve-operation position PR of the WGV 31, and when the real position PS reaches the abnormality-judgment value PE, it is judged that an abnormality is caused or not caused in the mechanical-connecting condition from the WGV 31 to the WGA 34.

$$PR = PC$$

Figure 6:
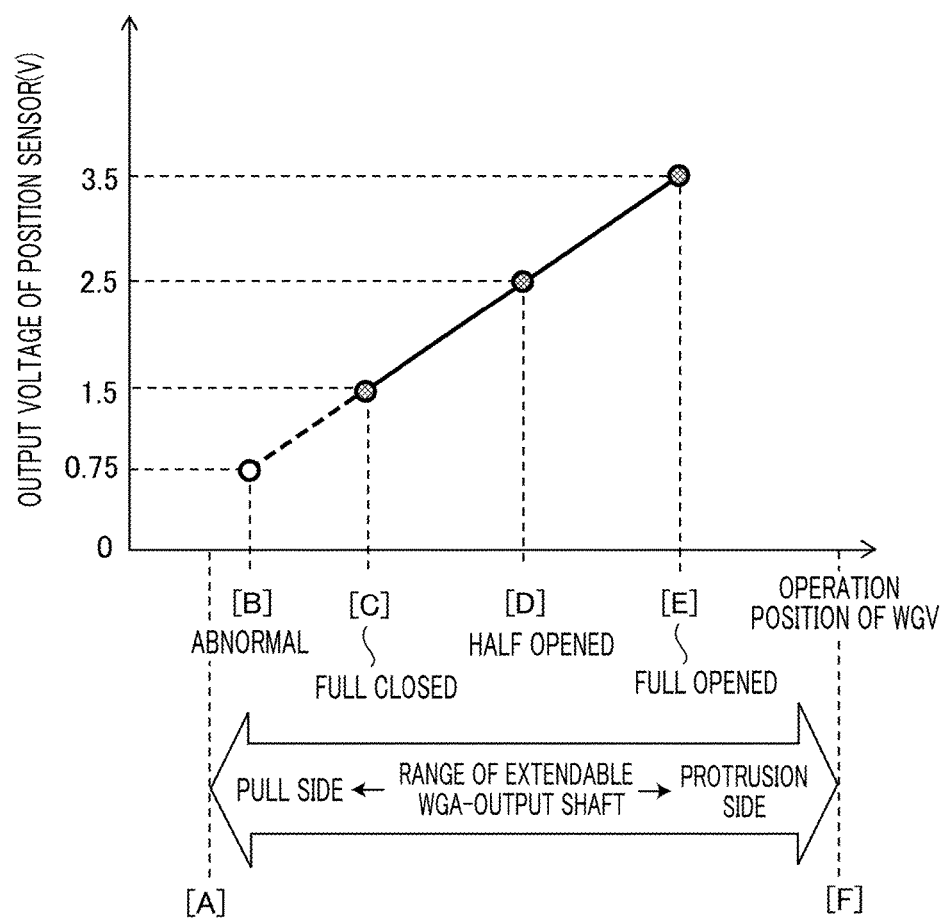
FIG. 6 is an explanatory diagram illustrating a relationship between an operation position of the WGV and an output voltage of a position sensor.
Figure 7A:
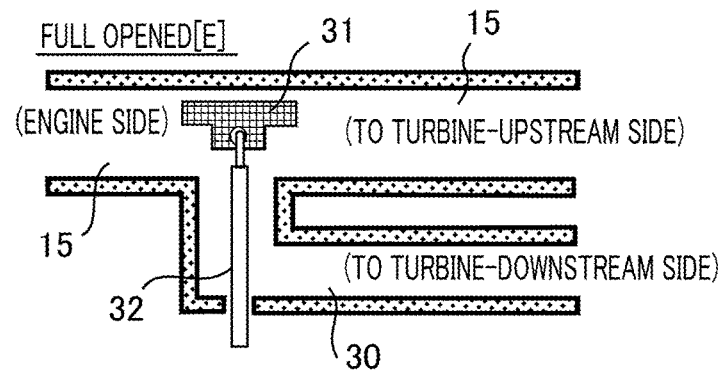
FIG. 7A is an explanatory diagram illustrating a condition in which the WGV is full opened.
Figure 7B:
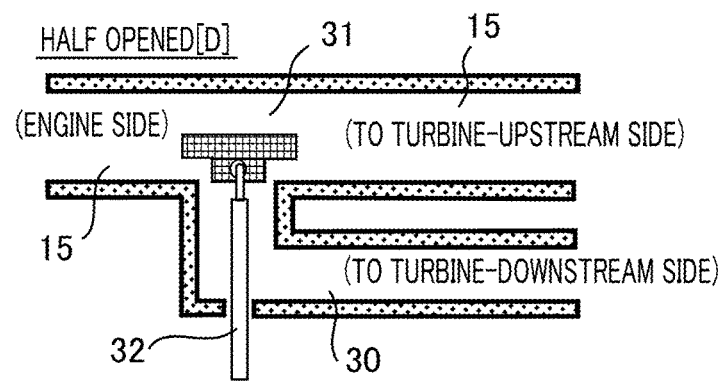
FIG. 7B is an explanatory diagram illustrating a condition in which the WGV is half opened.
Figure 7C:
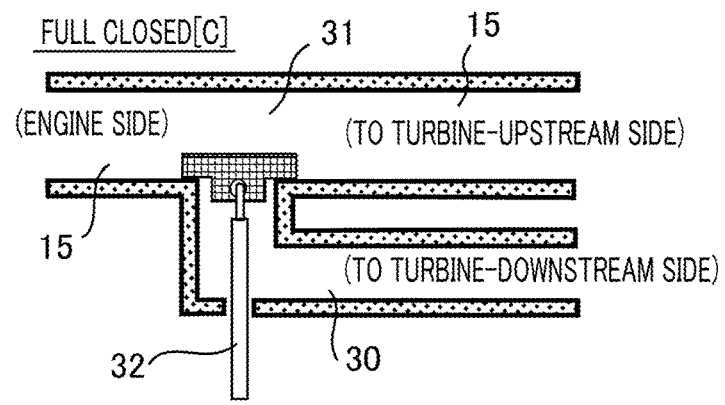
FIG. 7C is an explanatory diagram illustrating a condition in which the WGV is full closed.

The real position PS, which is detected by the position sensor 53 and is used as a voltage value, is inputted to the WGA-control component 503, which is used as a bypass-valve-control component, and the abnormality-judgment component 504. Hereinafter, a relationship between the operation position of the WGV 31 and the real position, which is detected by the position sensor 53, will be explained. FIG. 6 is an explanatory diagram illustrating a relationship between the operation position of the WGV 31 and the output voltage of the position sensor 53, and the relationship is indicated in FIG. 6 in which a horizontal axis is assigned as the operation position of the WGV 31, and a vertical axis is assigned as the output voltage of the position sensor 53. FIG. 7A is an explanatory diagram illustrating a condition in which the WGV is full opened, and FIG. 7A corresponds to the full-opened valve position [E] in FIG. 6; FIG. 7B is an explanatory diagram illustrating a condition in which the WGV is half opened, and FIG. 7B t corresponds to the half-opened valve position [D] in FIG. 6; and FIG. 7C is an explanatory diagram illustrating a condition in which the WGV is full closed, and FIG. 7C corresponds to the full-closed valve position [C] in FIG. 6.

The WGA output shaft 33 can be moved from an operation position [A] to an operation position [F] in the horizontal axis direction in FIG. 6, in a condition where the WGV 31, the joint component 32, and the WGA output shaft 33 are mechanically connected and regulated in such a way that the WGV 31 is full closed when the WGA output shaft 33 is moved to the full-closed valve position [C]. Therefore, when the WGV 31 is operated at the full-closed valve position [C], the output voltage of the position sensor 53 is 1.5 volts; when the WGV 31 is operated at the half-opened valve position [D], the output voltage of the position sensor 53 is 2.5 volts; and when the WGV 31 is operated at the full-opened valve position [E], the output voltage of the position sensor 53 is 3.5 volts. Thereby, real positions corresponding to each of the output voltages of the position sensor 53 are detected.

Moreover, the required-exhaust-bypass-valve-operation position PR, which is set in accordance with the operating condition of the internal combustion engine 10, is set to the target position PT0 by the control unit 50, and a current direction and an amount of current of the motor, which is installed in the WGA 34, are controlled in such a way that real position PS, which is detected by the position sensor 53, agrees with the target position PT0.

In a focused condition where the WGV 31 is set at the full-closed valve position [C], the WGV 31 is physically contacted and fitted to an inside wall of an exhaust pipe in a state where the exhaust-bypass passage 30 is closed by the WGV 31, and the output voltage of the position sensor 53 is 1.5 volts. In this condition, even if the motor is energized in such a way that the WGA output shaft 33 is more pulled toward the WGA 34 from the full-closed valve position [C] of the WGV 31, the WGV 31 cannot be more closed, so that the position sensor 53 does not output an voltage being lower than 1.5 volts. In other words, when the mechanical-connecting condition from the WGV 31 to the WGA 34 is normal, the real position PS, which is detected by the position sensor 53, does not indicate a voltage being lower than 1.5 volts which is outputted at the full-closed valve position [C] of the WGV 31.

On the other hand, when the motor is energized in such a way that the WGA output shaft 33 is more pulled toward the WGA 34 from the full-closed valve position [C] of the WGV 31 in a condition where the WGV 31 is chipped or the WGA output shaft 33 is not linked to the joint component 32 by some troubles, the WGV 31 is not normally contacted to the inside wall of the exhaust pipe, and only the WGA output shaft 33, of which position is detected by the position sensor 53, is pulled into the WGA 34. As a result, the operation position of the WGV 31 is deviated from the full-closed valve position [C], and a voltage value 0.75 volts, which is detected at a further-closed position [B] indicated in FIG. 6, will be detected as a real position.

As described above, in order to judge that the WGV 31 is deviated from the full-closed valve position [C], the voltage value, which is detected at the further-closed valve position [B] in comparison with the full-closed valve position [C] of the WGV 31, is defined as an abnormality-judgment value, and when a voltage value, which is detected by the position sensor 53, reaches to the abnormality-judgment value, it can be judged that the abnormality is caused in the mechanical-connecting condition from the WGV 31 to the WGA 34.

In addition, the full-closed valve position [C] of the WGV 31 is varied in accordance with an attachment tolerance between the joint component 32 and the WGA 34, an output voltage tolerance of the position sensor 53, or a thermal expansion of each component, so that it is required that the abnormality-judgment value, in other words, the output voltage of the position sensor 53, which is accurately detected at the position [B] indicated in FIG. 6, is accurately judged even when the full-closed position of the WGV 31 is varied in accordance with the variations of the tolerances. Therefore, the abnormality-judgment value at the position [B] is set as a voltage value which is higher than the voltage value at the pull-end position [A] within a range of extendable WGA-output shaft 33, and is lower than the voltage value at the full-closed position [C] at which the variation of the tolerances is a lowest limit value.

In the above-described control device for the internal combustion engine according to Embodiment 1 of the present invention, there is the focused characteristic in which the detection range of the real position detected by the position sensor 53 is varied in accordance with the normality/abnormality of the mechanical-connecting condition from the WGV 31 to the WGA 34, and when the real position PS is deviated from the full-closed valve position [C] of the WGV 31 so as to reach an abnormal judgment value which is lower than the value set at the full-closed valve position [C] of the WGV 31, the abnormality of the mechanical-connecting condition from the WGV 31 to the WGA 34 is judged. Therefore, the generated abnormality, in which the WGV 31 or the joint component 32 is broken, can be identified in the closing-operation failures of the WGV 31, and a time for troubleshooting the abnormality can be decreased.

Moreover, the closing-operation failures of the WGV 31 are detected in accordance with the real position PS detected by the position sensor 53, so that at least the abnormality in the mechanical-connecting condition from the WGV 31 to the WGA 34 can be detected in the closing-operation failures of the WGV 31 without limitation of a high-rpm and heavy-load operating condition in which the supercharging pressure is increased, in other words, regardless of the operating condition of the internal combustion engine 10.

Moreover, when the WGA 34 is controlled in such a way that the real position PS agrees with the target position PT0, the abnormality in the mechanical-connecting condition from the WGV 31 to the WGA 34 is judged in a condition where the target position PT0 is set to the full-closed valve position [C] of the WGV 31, so that the generated abnormality, in which the WGV 31 or the joint component 32 is broken, can be more certainly identified in the closing-operation failures of the WGV 31.

Embodiment 2

Hereinafter, a control device for an internal combustion engine according to Embodiment 2 of the present invention will be explained. In the control device for the internal combustion engine according to Embodiment 1, when the real position PS indicates an abnormality-judgment value in a condition where the target position PT0 is set at a position which is separated from the full-closed valve position [C] of the WGV 31, and the WGA 34 is controlled in such a way that the real position PS agrees with the target position PT0, it is estimated that a closing-operation failures of the WGV 31 is caused by a failure which is different from an abnormality in the mechanical-connecting condition from the WGV 31 to the WGA 34. However, in the control device for the internal combustion engine according to Embodiment 2, components can be adaptable to the above-described failure. In FIG. 1 and FIG. 2, the configurations according to Embodiment 2 are identical to the configurations according to Embodiment 1, so that an explanation for FIG. 1 and FIG. 2 will be omitted.

Figure 4:
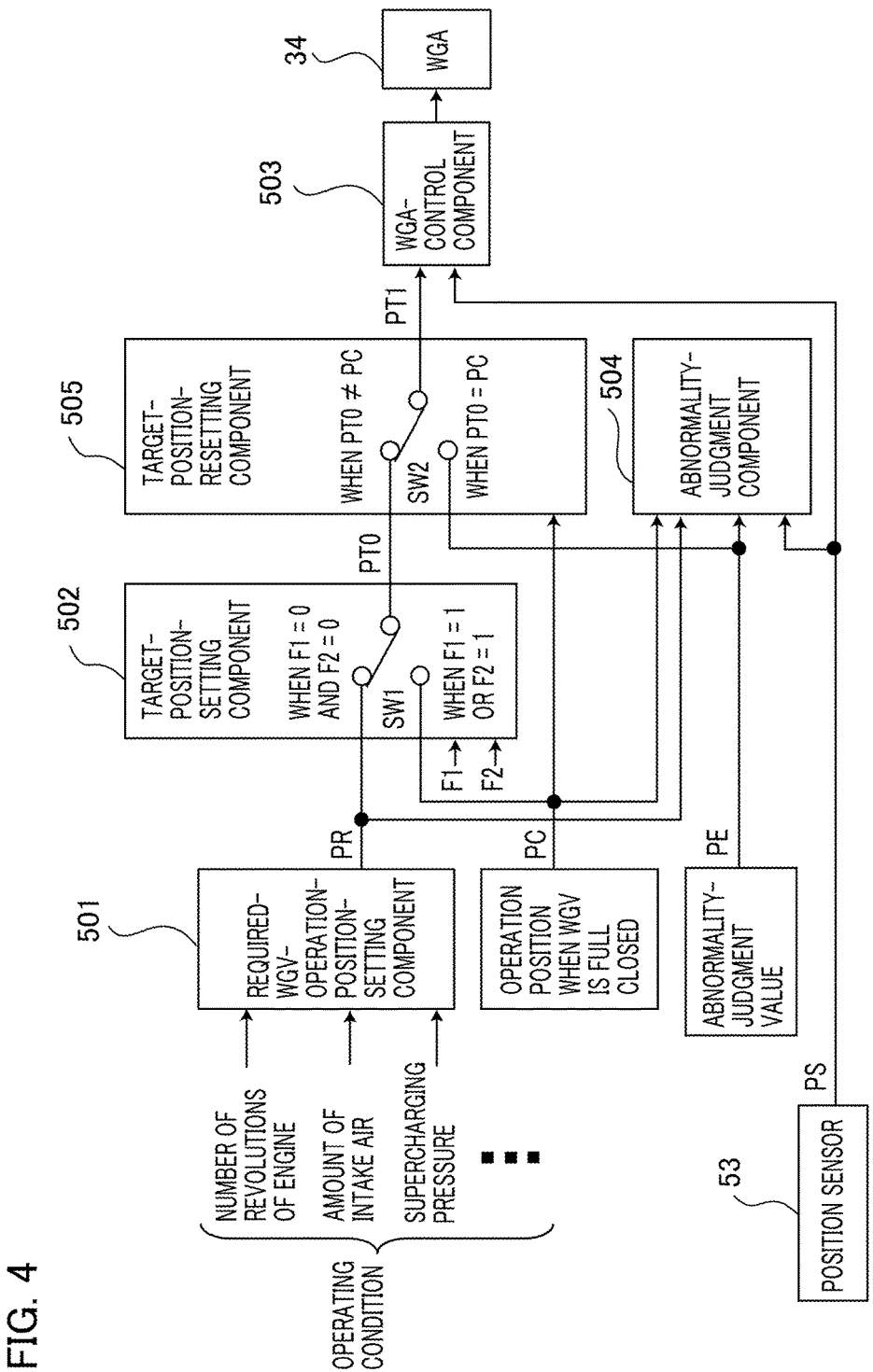
FIG. 4 is a block diagram illustrating the control device for the internal combustion engine according to Embodiment 2 of the present invention.

FIG. 4 is a block diagram illustrating the control device for the internal combustion engine according to Embodiment 2 of the present invention. A function of a target-position-setting component 502 in FIG. 4 is different from a function of the target-position-setting component 502 in FIG. 3 according to Embodiment 1, and a target-position-resetting component 505 is further included. Hereinafter, a configuration and an operation of a WGV 31 will be explained in reference to FIG. 4.

A required-WGV-operation-position-setting component 501 inputs many information items, such as a number of revolutions of the internal combustion engine, an amount of intake air detected by an airflow sensor 51, and a supercharging pressure detected by a throttle-upstream-pressure sensor 52, which indicate an operating condition of an internal combustion engine 10, as indicated in FIG. 2, and then, a required-WGV-operation position PR of the WGV 31 is set in reference to the information items.

The target-position-setting component 502 further inputs an operation position PC, at which the WGV 31 is full closed, a first flag F1, and a second flag F2 in addition to the required-WGV-operation position PR of the WGV 31 set by the required-WGV-operation-position-setting component 501, whereby a switching means SW1 is switched in accordance with conditions of the first flag F1 and the second flag F2, and any one of the required-WGV-operation position PR and the operation position PC, at which the WGV 31 is full closed, is set to a target position PT0.

Specifically, when the following formula is established, the required-WGV-operation position PR is selected and set to the target position PT0.

$$F1=0 \text{ and } F2=0$$

On the other hand, when the following formula is established, the operation position PC, at which the WGV 31 is full closed, is selected and set to the target position PT0.

$$F1=1 \text{ or } F2=1$$

Here, the first flag F1 is established during a predetermined time after an operating condition is judged in a state where an injection and feed of fuel to the internal combustion engine are stopped (for example, before the engine is started, when a car speed is reduced and feed of fuel is cut, or after the engine is stopped), and the second flag F2 is established during the predetermined time after an operating condition is judged in a state where the WGV 31 is full closed but the engine is not supercharged (for example, when the engine is started, when the engine is idled, or when the engine is operated under a light load). Thereby, the control device is configured in such a way that the operation position PC, at which the WGV 31 is full closed, is temporarily set to the target position PT0 during the predetermined time after the following formula is established.

$$F1=1 \text{ or } F2=1$$

The target-position-resetting component 505 further inputs the operation position PC, at which the WGV 31 is full closed, and an abnormality-judgment PE in addition to the target position PT0 set by the target-position-setting component 502, whereby a switching means SW2 is switched in accordance with a value of the target position PT0, and any one of the target position PT0 and the abnormality-judgment PE is reset to a target position PT1. Specifically, when the following formula is established, the target position PT0 is selected and reset to the target position PT1.

$$PT0 \neq PC$$

On the other hand, when the following formula is established, the abnormality-judgment PE is selected and reset to the target position PT1.

$$PT0=PC$$

Moreover, a WGA-control component 503 inputs a real position PS, which is detected by the position sensor 53, and the target position PT1, which is reset by the target-position-resetting component 505, and then, the WGA 34 is controlled in such a way that the real position PS agrees with the reset-target position PT1.

Hereinafter, an operation related to abnormality-judgment control of the WGV 31 will be explained. In a similar way indicated in FIG. 3, an abnormality-judgment component 504 inputs the real position PS which is detected by the position sensor 53, the abnormality-judgment value PE which is set in order to judge that the real position PS is deviated from the operation position PC at which the WGV 31 is full closed, the operation position PC at which the WGV 31 is full closed, and a required-WGV-operation position PR of the WGV 31, which is set by the required-WGV-operation-position-setting component 501, and when the real position PS reaches the abnormality-judgment value PE, it is judged that an abnormality is caused in the mechanical-connecting condition from the WGV 31 to the WGA 34. In the other case, only when the required-WGV-operation position PR is compared with the operation position PC at which the WGV 31 is full closed, and the following formula is established, in other words, only when the operation position PC, at which the WGV 31 is full closed, is set to the required-WGV-operation position PR of the WGV 31, and the real position PS reaches the abnormality-judgment value PE, it is judged that an abnormality is caused in the mechanical-connecting condition from the WGV 31 to the WGA 34.

$$PR=PC$$

Figure 5:
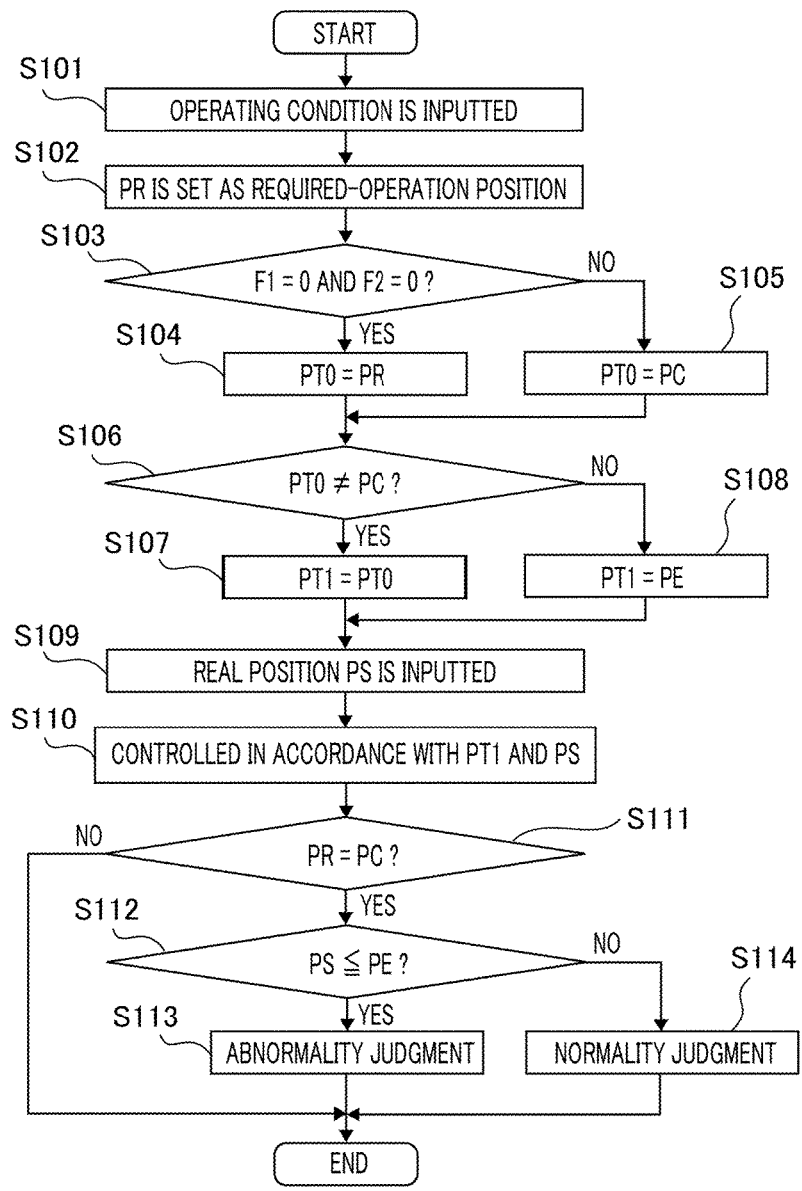
FIG. 5 is a flowchart for explaining an operation of the control device for the internal combustion engine according to Embodiment 2 of the present invention.

Hereinafter, an operation of the control device for the internal combustion engine according to Embodiment 2 of the present invention will be explained in accordance with a flowchart. FIG. 5 is the flowchart for explaining an operation of the control device for the internal combustion engine according to Embodiment 2 of the present invention. In FIG. 5, many information items—a number of revolutions of the internal combustion engine 10, an amount of intake air detected by the airflow sensor 51, and a supercharging pressure detected by the throttle-upstream-pressure sensor 52—, which indicate an operating condition of the internal combustion engine 10, are inputted in step S101. In step S102, the required-WGV-operation position PR of the WGV 31 is set in accordance with the information items which are inputted in step S101 (operation of the required-WGV-operation-position-setting component 501).

In step S103, the target position PT0 is set in accordance with the conditions of the first flag F1 and the second flag F2. Here, when the following formula is established (Yes), the process proceeds from step S103 to step S104, and required-WGV-operation position PR is set to the target position PT0, and then, the process proceeds to step S106.

$$F1=0 \text{ and } F2=0$$

On the other hand, when the above formula is not established (No), the process proceeds from step S103 to step S105, the operation position PC, at which the WGV 31 is full closed, is set to the target position PT0, and then, the process proceeds to step S106 (operation of the target-position-setting component 502).

In step S106, the target position PT1 is reset in accordance with the conditions of the target position PT0. Here, when the following formula is established (Yes), the process proceeds from step S106 to step S107, and the target position PT0, which is set in step S104 or step S105, is set to the target position PT1, and the process proceeds to step S109.

$$PT0 \neq PC$$

On the other hand, when the above formula is not established (No), the process proceeds from step S106 to step S108, and the abnormality-judgment value PE is set to the target position PT1, and then, the process proceeds to step S109 (operation of the target-position-resetting component 505).

In step S109, the real position PS detected by the position sensor 53 is inputted. In next step S110, an amount of current of the motor of the WGA 34 is controlled in accordance with the real position PS, which is inputted in step S109, and the target position PT1, which is reset in step S107 or step S108, in such a way that real position PS agrees with the target position PT1 (operation of the WGA-control component 503).

In next step S111, the required-WGV-operation position PR, which is set in step S102, is compared with the operation position PC at which the WGV 31 is full closed, and it is judged that an abnormality-judgment routine is performed or not performed. Here, when the following formula is not established (No), the abnormality-judgment routine in step S112 is not performed, and the process is terminated.

PR=PC

On the other hand, when the judgment is performed in step S111 and the following formula is established (Yes), the process proceeds from step S111 to step S112 in order to perform the abnormality-judgment routine.

PR=PC

In step S112, the real position PS, which is inputted in step S109, is compared with the abnormality-judgment value PE. When the following formula is established (Yes), the process proceeds from step S112 to step S113, and it is judged that an abnormality is caused in the mechanical-connecting condition from the WGV 31 to the WGA 34, and when the following formula is not established (No), the process proceeds from step S112 to step S114, and it is judged that an abnormality is not caused in the mechanical-connecting condition from the WGV 31 to the WGA 34, and then, the process is terminated (operation of the abnormality-judgment component 504).

PS≤PE

In the above-described control device for the internal combustion engine according to Embodiment 2 of the present invention, when it is judged that an operating condition, in which an injection and feed of fuel to the internal combustion engine 10 are stopped, is continued, the required-WGV-operation position PR is temporarily replaced to the operation position PC for full closing the WGV 31, and the operation position PC is set to the target position PT1. Therefore, for example, even before the internal combustion engine 10 is started, or even when a car speed is reduced and feed of fuel is cut, it can be judged that an abnormality is caused or not caused in the mechanical-connecting condition from the WGV 31 to the WGA 34, and operation conditions for detecting an abnormality can be enlarged.

In addition, when the injection and feed of fuel to the internal combustion engine 10 are stopped, the fuel is not burned in the internal combustion engine 10. Therefore, even if the opened-valve position of the WGV 31 is forcibly changed to the full-closed valve position [C], the outputted-torque control of the internal combustion engine 10 is not affected, and a trouble is not caused.

Moreover, in the above-described control device for the internal combustion engine according to Embodiment 2 of the present invention, when it is judged that an operating condition, in which the WGV 31 is full closed but the engine is not supercharged, is continued, the required-WGV-operation position PR is temporarily replaced to the operation position PC for full closing the WGV 31, and the operation position PC is set to the target position PT1. Therefore, for example, even when the internal combustion engine 10 is started, or even when the engine 10 is idled or operated under a low rotational speed and light load condition, it can be judged that an abnormality is caused or not caused in the mechanical-connecting condition from the WGV 31 to the WGA 34, and the operation conditions for detecting the abnormality can be enlarged.

In addition, even if the position of the WGV 31 is set to the full-closed valve position [C], or even if the position of the WGV 31 is forcibly changed to the full-closed valve position [C] in a state where the engine is not supercharged, a supercharging effect by the compressor is not caused, or a rare supercharging effect is caused, so that the outputted-torque control of the internal combustion engine 10 is not almost affected, and a trouble is not caused.

Moreover, in the above-described control device for the internal combustion engine according to Embodiment 2 of the present invention, when the operation position PC for full closing the WGV 31 is to the target position PT0, the abnormality-judgment value PE, which is set in order to judge that the real position PS is deviated from the operation position PC at which the WGV 31 is full closed, is reset to target position PT0, and when the real position PS reaches the abnormality-judgment value PE, it is judged that the abnormality is caused in the mechanical-connecting condition from the WGV 31 to the WGA 34, so that it can be more certainly and promptly identified that the closing-operation failures of the WGV 31, in which the WGV 31 or the joint component 32 is broken, is caused.

The above-described control device for the internal combustion engine according to Embodiment 1 of the present invention is realized by crystallizing the following invention contents (1) and (2).

Moreover, the above-described control device for the internal combustion engine according to Embodiment 2 of the present invention is realized by crystallizing the following invention contents (1), (2), (3), (4), and (5).

Invention content (1): A control device for an internal combustion engine, comprising: a turbocharger including a turbine which is provided at an exhaust passage of the internal combustion engine, and a compressor which is provided at an intake air passage of the internal combustion engine so as to be integrally rotated with the turbine; an exhaust-bypass valve which is provided at an exhaust-bypass passage for linking an upstream side and an downstream side of the turbine so as to control a flow rate of exhaust gas, which flows through the exhaust-bypass passage, of the internal combustion engine; an exhaust-bypass-valve-driving device which is mechanically connected to the exhaust-bypass valve so as to regulate an operation position of the exhaust-bypass valve; a position sensor for detecting the operation position of the exhaust-bypass valve so as to assign the operation position to a real position; a required-exhaust-bypass-valve-operation-position-setting component for setting a required-exhaust-bypass-valve-operation position of the exhaust-bypass valve in accordance with an operating condition of the internal combustion engine; a target-position-setting component for setting the required-exhaust-bypass-valve-operation position, which is set by the required-exhaust-bypass-valve-operation-position-setting component, to a target position; an exhaust-bypass-valvecontrol component for controlling the exhaust-bypass-valve-driving device in such a way that the real position, which is detected by the position sensor, agrees with the target position which is set by the target-position-setting component; and an abnormality-judgment component for judging that an abnormality is caused in a mechanical-connecting condition from the exhaust-bypass valve to the exhaust-bypass-valve-driving device when the real position, which is detected by the position sensor, reaches a predetermined abnormality-judgment value.

Invention content (2): A control device for the internal combustion engine as recited in the invention content (1), wherein the abnormality-judgment component judges that the abnormality is caused in the mechanical-connecting condition from the exhaust-bypass valve to the exhaust-bypass-valve-driving device when the real position reaches the abnormality-judgment value in a state where at least an operation position for full closing the exhaust-bypass valve is set to the required-exhaust-bypass-valve-operation position, and the exhaust-bypass valve is controlled.

According to the invention content (2), the generated abnormality, in which the exhaust-bypass valve or the joint component is broken, can be more certainly identified in the closing-operation failures of the exhaust-bypass valve. In addition, when the real position indicates the abnormality-judgment value in a state where the target position is set at a position which is separated from the operation position when the exhaust-bypass valve is full closed, and the exhaust-bypass valve is controlled in such a way that the real position agrees with the target position, it is estimated that a closing-operation failures of the exhaust-bypass valve is caused by a failure which is different from an abnormality in the mechanical-connecting condition from the exhaust-bypass valve to the exhaust-bypass-valve-driving device.

Invention content (3): A control device for the internal combustion engine as recited in the invention content (1), wherein the target-position-setting component sets the operation position for full closing the exhaust-bypass valve, instead of using the required-exhaust-bypass-valve-operation position which is set by the required-exhaust-bypass-valve-operation-position-setting component, to the target position when it is judged that an operating condition, in which an injection and feed of fuel to the internal combustion engine are stopped, is continued.

According to the invention content (3), for example, even before the internal combustion engine is started, or even when a car speed is reduced and feed of fuel is cut, it can be judged that an abnormality is caused or not caused in the mechanical-connecting condition from the exhaust-bypass valve to the exhaust-bypass-valve-driving device, and operation conditions for detecting an abnormality can be enlarged. In addition, when the injection and feed of fuel to the internal combustion engine are stopped, the fuel is not burned in the internal combustion engine. Therefore, even if the opened-valve position of the exhaust-bypass valve is forcibly changed to the full-closed valve position, the outputted-torque control of the internal combustion engine is not affected, and a trouble is not caused.

Invention content (4): A control device for the internal combustion engine as recited in the invention content (1), wherein the target-position-setting component sets an operation position for full closing the exhaust-bypass valve, instead of using the required-exhaust-bypass-valve-operation position which is set by the required-exhaust-bypass-valve-operation-position-setting component, to the target position when it is judged that an operating condition, in which the exhaust-bypass valve is full closed but the internal combustion engine is not supercharged, is continued.

According to the invention content (4), for example, even when the internal combustion engine is started, or even when the engine is idled or operated under a low rotational speed and light load condition, it can be judged that an abnormality is caused or not caused in the mechanical-connecting condition from the exhaust-bypass valve to the exhaust-bypass-valve-driving device, and the operation conditions for detecting the abnormality can be enlarged. In addition, even if the position of the exhaust-bypass valve is set to the full-closed valve position, or even if the position of the exhaust-bypass valve is forcibly changed to the full-closed valve position in a state where the engine is not supercharged, a supercharging effect by the compressor is not caused, or a rare supercharging effect is caused, so that the outputted-torque control of the internal combustion engine is not almost affected, and a trouble is not caused.

Invention content (5): A control device for the internal combustion engine as recited in the invention content (3), wherein a target-position-resetting component, which resets the target position, is further included; and the target-position-resetting component resets the abnormality-judgment value, instead of using the operation position for full closing the exhaust-bypass valve, to the target position when the operation position for full closing the exhaust-bypass valve is set to the target position by the target-position-setting component; and the abnormality-judgment component judges that the abnormality is caused in the mechanical-connecting condition from the exhaust-bypass valve to the exhaust-bypass-valve-driving device when the real position reaches the abnormality-judgment value in a state where the abnormality-judgment value is rest to the target position by the target-position-resetting component, and the exhaust-bypass valve is controlled. According to the invention content (5), it can be more certainly and promptly identified that the closing-operation failures of the exhaust-bypass valve, in which the exhaust-bypass valve or the joint component is broken, is caused.

In addition, it is possible in the scope of the present invention that each of embodiments is freely combined, or each of embodiments is suitably modified or omitted.

What is claimed is:
1. A control device for an internal combustion engine, comprising:
a turbocharger including a turbine which is provided at an exhaust passage of the internal combustion engine, and a compressor which is provided at an intake air passage of the internal combustion engine so as to be integrally rotated with the turbine;
an exhaust-bypass valve which is provided at an exhaust-bypass passage for linking an upstream side and a downstream side of the turbine to control a flow rate of exhaust gas, which flows through the exhaust-bypass passage, of the internal combustion engine;
an exhaust-bypass-valve-driving device which is a wastegate actuator (WGA) mechanically connected to the exhaust-bypass valve which drives the exhaust-bypass valve to open and close positions;
a position sensor which detects an output voltage value indicating a current position of the exhaust-bypass valve from among the open and close positions; and
a controller which:
sets a required-exhaust-bypass-valve-operation position of the exhaust-bypass valve based on an operating condition of the internal combustion engine, sets the required-exhaust-bypass-valve-operation position as a target position;

controls the exhaust-bypass-valve-driving device to drive the exhaust-bypass valve so that the current position matches the target position; and judges that an abnormality exists in a mechanical connection between the exhaust-bypass valve and the exhaust-bypass-valve-driving device, when the output voltage value detected by the sensor matches a predetermined abnormality-judgment value.

2. The control device for the internal combustion engine as recited in claim 1, wherein the controller judges that the abnormality is caused in the mechanical connection when the output voltage value indicating the current position reaches the abnormality-judgment value in a state where the required-exhaust-bypass-valve-operation position is set at fully closing the exhaust-bypass valve, and the exhaust-bypass valve is controlled to match the target position.

3. The control device for the internal combustion engine as recited in claim 1, wherein the controller sets the target position to fully closing the exhaust-bypass valve instead of setting the target position to the required-exhaust-bypass-valve-operation position when the controller judges that the operating condition of the internal combustion engine is such that an injection and feed of fuel to the internal combustion engine are stopped for a predetermined period of time.

4. The control device for the internal combustion engine as recited in claim 1, wherein the controller sets the target position to fully closing the exhaust-bypass valve, instead of setting the target position to the required-exhaust-bypass-valve-operation position, when the controller judges that the internal combustion engine is not super charged for a predetermined period of time.

5. The control device for the internal combustion engine as recited in claim 3, wherein the controller further resets the target position and resets the abnormality-judgment value when the output voltage value indicating the current operation position detected by the position sensor is a fully closed position of the exhaust-bypass valve; and wherein the controller further judges that the abnormality is caused in the mechanical connection when the current position reaches the abnormality-judgment value in a state where the abnormality-judgment value is reset to the target position, and the exhaust-bypass valve is driven.

6. The control device for an internal combustion engine as recited in claim 1, wherein the controller sets the predetermined abnormality-judgment value to a voltage value, which is lower than the output voltage value detected by the sensor, when the exhaust-bypass valve is fully closed and when the internal combustion engine is not operating abnormally.

7. The control device for an internal combustion engine as recited in claim 1, wherein the controller detects the abnormality while the internal combustion engine is operating regardless of operating conditions of the operating internal combustion engine.

8. The control device for an internal combustion engine as recited in claim 1, wherein the abnormality existing in the mechanical connection between the exhaust-bypass valve and the exhaust-bypass-valve-driving device comprises the abnormality existing in a joint component which connects the exhaust-bypass-valve and the exhaust-bypass-valve driving device.

9. The control device for an internal combustion engine as recited in claim 1, further comprising a joint component which connects the exhaust-bypass-valve and the exhaust-bypass-valve driving device and wherein the judged abnormality of the mechanical connection is the joint component is not linked to an output shaft of the exhaust-bypass-value-driving device.

10. The control device for an internal combustion engine as recited in claim 9, wherein the joint component comprises:

an annularly shaped output shaft linkage portion formed at a tip of an output shaft of the exhaust-bypass-valve-driving device;

a first annularly shaped joint-component-linkage portion formed at one end of the joint component and penetrating inside of the output shaft linkage portion; and a second annularly shaped joint -component-linkage portion which penetrates a through hole of the output shaft linkage portion and which is formed at the other end of the joint component.

* * * * *